Nov. 17, 1925.
J. G. RIEFF
PORTABLE FEED BIN
Filed May 31, 1924   2 Sheets-Sheet 1
1,562,002
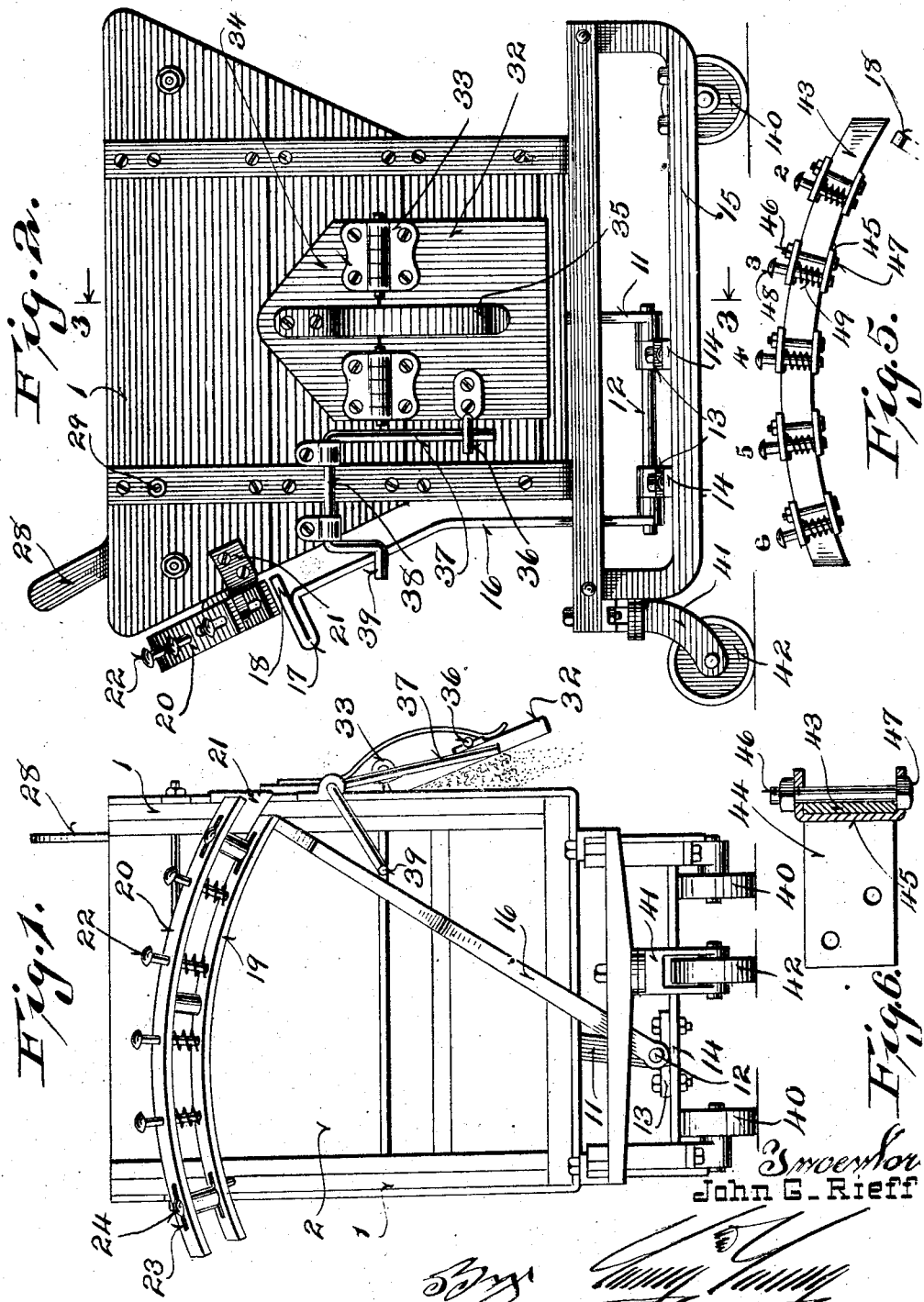

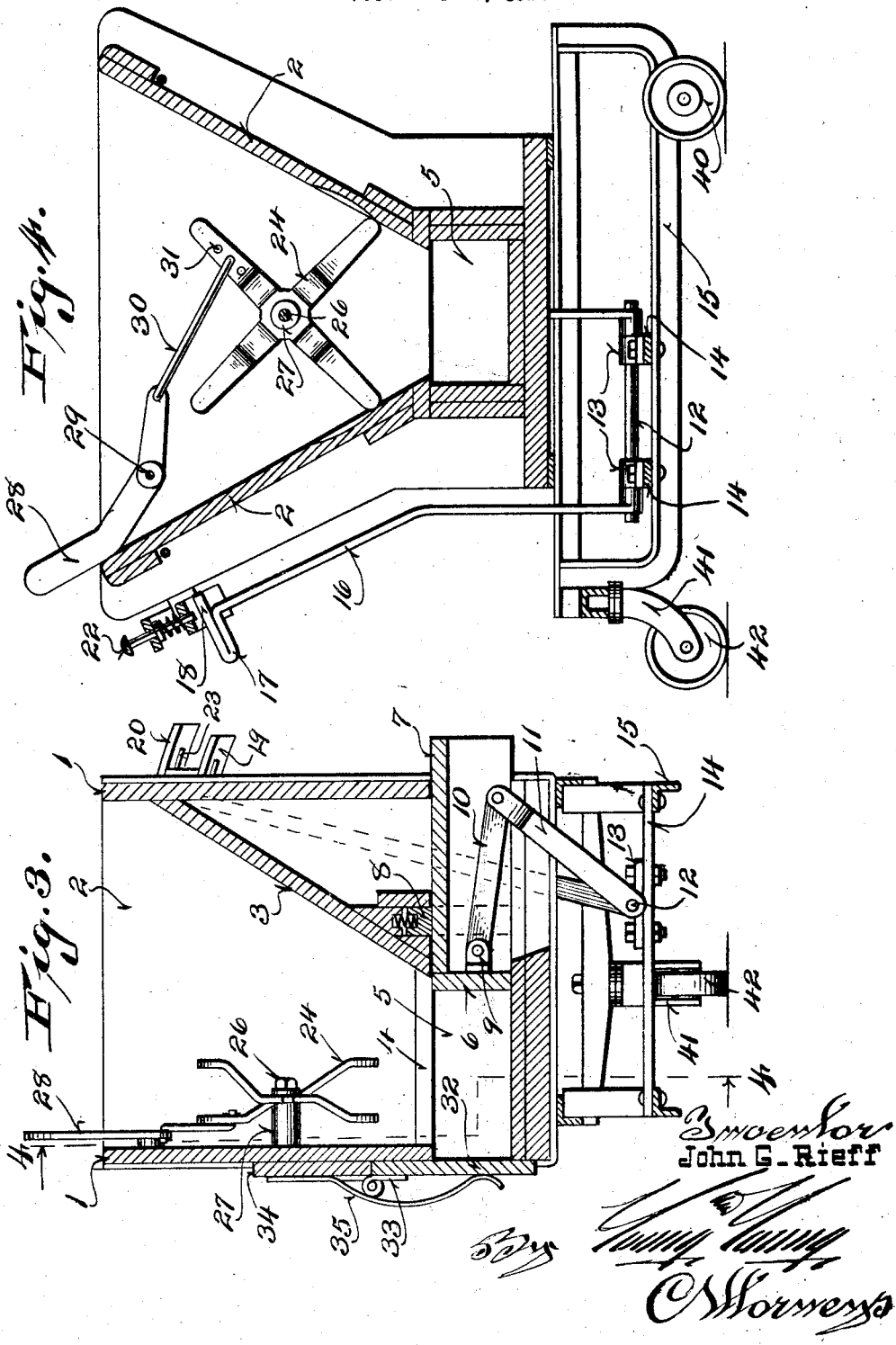

Patented Nov. 17, 1925.

1,562,002

UNITED STATES PATENT OFFICE.

JOHN G. RIEFF, OF LONDON, WISCONSIN.

PORTABLE FEED BIN.

Application filed May 31, 1924. Serial No. 717,131.

*To all whom it may concern:*

Be it known that I, JOHN G. RIEFF, a citizen of the United States, and resident of London, in the county of Dane and State of Wisconsin, have invented certain new and useful Improvements in Portable Feed Bins; and I do hereby declare that the following is a full, clear, and exact description thereof.

This invention relates to portable feed bins.

In feeding cattle for instance, difficulty has been experienced in apportioning the feed to the exact needs of the cow or other animal.

Attempts to solve this problem have resulted in complicated relatively large and cumbersome trucks with individual compartments provided with drawerlike portions with the names of the cows thereon. This construction, obviously, is expensive, unwieldy and is not an efficient device.

This invention is designed to overcome the above noted defects, and objects of such invention are to provide a portable feed bin which is so constructed that it may be easily positioned adjacent each trough, and which will automatically deliver the exact amount of feed required for the particular cow in a simple and effective manner.

Further objects are to provide a portable feed bin which is equipped with manually operable gauge members whereby the amount of feed required may be accurately adjusted, and may be instantly changed as the different troughs are filled, and to provide means whereby the device is capable of handling silage, moist feed and other feed of this general type without any danger of packing or sticking of the feed in the apparatus so that each allotment is completely and fully discharged into the desired trough.

Further objects are to provide a portable measuring feed bin which may be adjusted to proportion and deliver the quantities of feed required either if measured in volume as by quarts, bushels or other measures, or may be set to deliver the feed in accordance with weight, for instance, the number of pounds desired.

Further objects are to provide a portable measuring feed bin which is highly practicable, which is of relatively simple and sturdy construction, and which may be most readily manufactured.

Embodiments of the invention are shown in the accompanying drawings, in which:—

Figure 1 is a rear view of the device.
Figure 2 is a side elevation thereof.
Figure 3 is a sectional view on the line 3—3 of Figure 2.
Figure 4 is a sectional view on the line 4—4 of Figure 3.
Figure 5 is a view of a modified form of individually adjustable gauging pins.
Figure 6 is an enlarged sectional view through the supporting strip showing one of the pin carrying elements in detail.

The device comprises a main hopper provided with vertical side walls 1, and with slanting end walls 2. This hopper is provided with an interior partition 3 which slants downwardly and towards one side, as clearly shown in Figure 3.

The lower portion of the hopper is provided with a discharge aperture 4 located above a rectangular measuring piston receiving cavity 5 (see Figures 3 and 4). Within this cavity, a plunger or piston 6 is positioned. This piston is equipped with rearwardly extending top and side walls 7, and is open at its bottom. Spring pressed packing strips 8 are provided on the tops and sides of the piston and are carried in suitable guiding slots formed in the body of the hopper. These packing strips prevent the working of the feed between the piston and the hopper body. It is provided with a bracket 9 which is connected by means of the link 10 with a pivotally mounted lever 11. The lever 11 is rigidly secured to a longitudinally extending rock shaft 12 which is carried in bearing 13 secured to transverse supporting bars 14. These bars 14 are directly secured to the angle iron side frames 15, as clearly shown in Figures 3 and 4. The rear end of the shaft 12 is rigidly attached to an upstanding manually manipulable lever 16 which is provided with an outwardly folded portion forming a handle 17 and is equipped with an inwardly extending arm 18, as shown in Figure 4.

The means for measuring the amount of feed discharged is so arranged that it controls the setting of the plunger 6. This means may comprise a pair of arcuate bars 19 and 20 (see Figure 1) which are carried by suitable brackets 21 secured to the body of the bin. These bars guide pins 22 which are spring pressed upwardly and are normally out of the way of the arm 18 (see Figure 4). The bars 19 and 20 are bodily adjustable with reference to the brackets 21. This is accomplished by providing elongated slots 23 at the ends of the bars 19 and 20 so that when the securing bolts 24 are loosened, the bars 19 and 20 may be slid to the right or the left with reference to the brackets 21 for a purpose hereinafter to appear.

Means are provided for insuring the discharge of the feed through the aperture 4 in the bin and in front of the plunger 6. This means may comprise a member provided with a plurality of staggered arms 25, as illustrated in Figures 3 and 4. This member is pivotally mounted upon a bolt 26 which passes through a spacer 27 and is attached to the side wall 1 of the bin. A manually operable lever 28 is pivotally mounted, as indicated at 29 (see Figure 4) and is connected by means of a link 30 with one of the arms 24.

It is to be noted that a plurality of apertures 31 are provided in the member 24 so that any desired degree of rocking may be secured.

The end of the meter or measuring chamber 5 is closed by means of a hingedly mounted flap 32 (see Figures 1, 2 and 3). This flap is preferably provided, as shown in Figure 2, with a pair of hinges 33 at its upper end which are attached to a plate 34. A spring 35 is also secured to the plate 34 and its lower free end bears against the flap 32. The flap 32 is further provided with a bracket terminating in an outwardly projecting arm 36 (see Figure 2). This arm is in the path of movement of a lever 37 which forms a continuation of a short rock shaft 38. The outer end of this rock shaft terminates in a crank 39 which is in the path of movement of the plunger operating lever 16, as shown in Figure 2.

The entire device may be carried in any suitable manner, as by means of a truck, as illustrated in the drawings, such truck comprising the side frames 15 which carry the forward rollers or wheels 40. The rear portion of the truck is equipped with a pivotally mounted fork 41 which carries a rear roller 42.

The operation of the apparatus is as follows:—The hopper is filled with ground feed, silage or other desired material, and it is rolled to a point adjacent the trough to be filled. The operator then depresses one of the pins 22 and rocks the lever 16 to the left, as shown in Figure 1, until the arm 18 thereof (see Figure 4) engages the depressed pin thus limiting further rearward motion. The plunger 6 is therefore withdrawn a measured amount from the forward end of the chamber 5. The operator then oscillates the lever 28 thus rocking the agitating member 24 causing an even filling of the vacant portion of the measuring chamber 5 in front of the plunger 6. Thereafter, the operator forces the lever 16 forwardly thus discharging the feed, as shown in Figure 1, the feed contacting with the flap 32 and elevating the flap, as shown in Figure 1. However, there is a tendency for the feed to pack or stick when the plunger arrives at its final position. This tendency is wholly overcome by the mechanism described as the lever 16 as it approaches its extreme forward position, engages the crank arm 39 (see Figure 2) and through the medium of the lever 37 and arm 36 suddenly jars the flap 32 throwing it outwardly to a greater extent and loosening any adhering feed. The device is then moved to the next trough and the required amount of feed is again gauged by depressing the appropriate pin 22.

It will be seen that the exact needs of the different cows may be easily accommodated by depressing the proper stop pin 22 and thus gauging exactly the amount of feed apportioned the particular cow.

The plungers 22 may be set apart a certain distance corresponding to a certain volume of feed or they may be set apart a distance corresponding to an exact weight of feed. In addition to this, the entire gauging mechanism is carried by the bars 19 and 20 and such bars are themselves bodily shiftable due to the elongated slots 23 (see Figure 1), so that exact adjustment of all of the pins may be simultaneously secured.

In the form of gauging pins illustrated in Figures 5 and 6, a single bar 43 of arcuate shape is employed in place of the bars 19 and 20 in the form previously described. This bar 43 is provided with apertured ears 44 by means of which it may be attached to the body of the bin, although obviously such bar 43 could be bodily adjustably mounted similarly to the bars previously described. The bar 43 carries a plurality of straplike members 45 which are provided with upper and lower flanges through which clamping bolts 46 pass so as to lock the individual U-shaped members 45 in any desired position of adjustment independently of the other members.

It is to be noted from reference to Figure 6 that the head 47 of the bolt 46 is seated within a cut out portion of the lower flange of the member 45, such cut out corresponding to the head and preventing rotation thereof. The bolt head bears directly against the bottom of the main bar 43 and thus when the bolt is tightened, the member 45 corresponding thereto is rigidly clamped in position.

Each of the members 45 carry a gauging pin 48 which is urged upwardly by means of a spring 49. These gauging pins are adapted to be selectively depressed into the path of movement of the arm 18 of the dispensing lever.

This last form of the invention is particularly desirable where various individual seatings of the pins are desired as for instance when the device is employed for dispensing different kinds of feed which, of course, have different weights.

It is obvious that changes may be made in the precise embodiment, and other means of supporting the apparatus may be employed in an obvious manner, for example an overhead trolley suspension could replace the truck.

It is, therefore, apparent that although the invention has been described in considerable detail, it is to be understood that the invention may be variously embodied and is, therefore, to be limited only as claimed.

I claim:

1. A portable measuring feed bin comprising a hopper having a measuring chamber located adjacent its lower portion, a reciprocatory plunger mounted within said chamber, a manually operable lever for reciprocating said plunger, and a plurality of independently actuable spring retracted stops for limiting the extent of motion of said plunger.

2. A measuring bin comprising a hopper having a measuring chamber adjacent its lower portion, said measuring chamber having a discharge end, a plunger slidably mounted within said chamber, a manually operable lever for reciprocating said plunger, a plurality of stop pins adapted to be selectively moved into the line of travel of said lever to gauge the extent of movement of said plunger, and a hingedly mounted spring pressed flap closing the discharge end of said chamber.

3. A feed measuring bin comprising a hopper, means for portably supporting said hopper, said hopper terminating in a transversely extending measuring chamber having an outer open discharge end, a hingedly mounted flap covering the open end of said chamber, a spring for yieldingly holding said flap in position, a lever for reciprocating said plunger, and means for operatively connecting said lever and flap when said lever approaches its extreme forward position, whereby said flap is thrown outwardly when said lever is rocked.

4. A feed measuring bin comprising a hopper, means for portably supporting said hopper, said hopper terminating in a transversely extending measuring chamber having an outer open discharge end, a hingedly mounted flap covering the open end of said chamber, a spring for yieldingly holding said flap in position, a lever for reciprocating said plunger, means for operatively connecting said lever and flap, and a plurality of spring retracted gauging pins adapted to be projected into the path of movement of said lever.

5. A feed measuring bin comprising a hopper having a measuring chamber at its lower end, said measuring chamber having a discharge end, a piston in said chamber, a lever for reciprocating said piston, bars located adjacent said lever, and a plurality of stop pins carried by said bars and adapted to be selectively projected into the path of travel of said lever.

6. A measuring bin comprising a hopper having a transverse measuring chamber at its lower end, a piston located within said chamber, a manually operable lever for reciprocating said piston, a pair of bars located adjacent said lever, a plurality of stop pins carried by said bars and adapted to be selectively projected into the path of travel of said lever, and springs for normally holding said pins in their retracted position out of the path of travel of said lever, said bars being bodily adjustable to vary the setting of said pins.

7. A feed measuring bin comprising a hopper having a measuring chamber at its lower end, means mounted within said hopper above said measuring chamber for agitating said feed, a reciprocatory plunger located within said chamber, a spring pressed flap closing one end of said chamber, a manually manipulable lever for reciprocating said plunger, means carried by said flap and adapted to be engaged by said lever at one end of the stroke of such lever, and a plurality of spring retracted stops adapted to be projected into the path of travel of said lever.

8. A feed measuring bin comprising a hopper having a measuring chamber at its lower end, said measuring chamber having a discharge end, a piston in said chamber, a lever for reciprocating said piston, bars located adjacent said lever, and a plurality of individually adjustable stop pins carried by said bars and adapted to be selectively projected into the path of travel of said lever.

In testimony that I claim the foregoing I have hereunto set my hand at London, in the county of Dane and State of Wisconsin.

JOHN G. RIEFF.